United States Patent [19]
Baird et al.

[11] Patent Number: 6,052,483
[45] Date of Patent: Apr. 18, 2000

[54] METHODS AND APPARATUS FOR CLASSIFICATION OF IMAGES USING DISTRIBUTION MAPS

[75] Inventors: Henry Spalding Baird, Maplewood; Tin Kam Ho, Cedar Grove, both of N.J.

[73] Assignee: Lucent Technologies Inc., Murray Hill, N.J.

[21] Appl. No.: 08/596,084

[22] Filed: Feb. 6, 1996

Related U.S. Application Data

[63] Continuation-in-part of application No. 08/335,212, Nov. 4, 1994, abandoned.

[51] Int. Cl.[7] .............................. G06K 9/46; G06K 9/62
[52] U.S. Cl. ........................................... 382/190; 382/224
[58] Field of Search .................................. 382/225, 224, 382/202, 209, 217, 218, 197, 174, 190

[56] References Cited

U.S. PATENT DOCUMENTS

| | | | |
|---|---|---|---|
| 4,566,124 | 1/1986 | Yamamoto et al. | 382/185 |
| 5,033,097 | 7/1991 | Nakamura | 382/174 |
| 5,036,544 | 7/1991 | Sakaue et al. | 382/241 |

OTHER PUBLICATIONS

Bledsoe et al. "Pattern Recognition and Reading by Machine," 1959 Proceedings of the Eastern Joint Computer Conference. pp. 225–232.

Duda and Hart. "Pattern Classification and Scene Analysis." pp. 141–147, 1973.

Liu et al. "A pattern Recognition Method Using Projection Pursuit." Proc. of the IEEE 1990 Aerospace and Electronics Conf., vol. 1, pp. 300–302, May 1990.

Ho et al. "Perfect Metrics", Proc. Second Int. Conf. on Document Analysis and Recognition, pp. 593–597, Oct. 1993.

Tufts et al. "Principal–Feature Classification."Proc. of 1995 IEEE Workshop on Neural Networks for signal processing. pp.125–134, Sep. 1995.

*Primary Examiner*—Jon Chang
*Attorney, Agent, or Firm*—Martin I. Finston

[57] ABSTRACT

An image classifier receives input images and assigns each input image to one of a plurality of image classes. The image classifier includes plural class distribution maps, each based on a plurality of features evaluated on training images, and each representing those feature values that occur at least once among the training images belonging to the corresponding class. The image classifier further includes means for constructing a test map by evaluating the plurality of features on the input image. The image classifier further includes means for comparing the test map to the class distribution maps in order to identify which one of the class distribution maps has the least distance to the test map. At least one of the features is defined according to a rule that relates to the shapes of images of at least one image class. One advantageous method for evaluating features is carried out storing the input pattern, in a digital memory, as a point in a representational space. A digital data-processing device retrieves one or more line segments from a library of line segments constructed in the representational space, wherein each said line segment is subdivided into plural indexed sub-intervals and each line segment is associated with a respective feature. The digital data-processing device projects the input pattern onto each of the retrieved line segments. For each said line segment, the feature associated with that line segment is assigned a value equal to the index of the sub-interval onto which the input pattern is projected.

5 Claims, 3 Drawing Sheets

FIG. 1
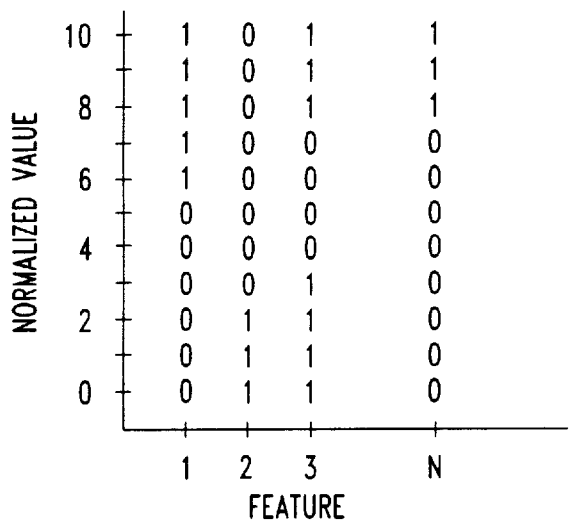
FIG. 2
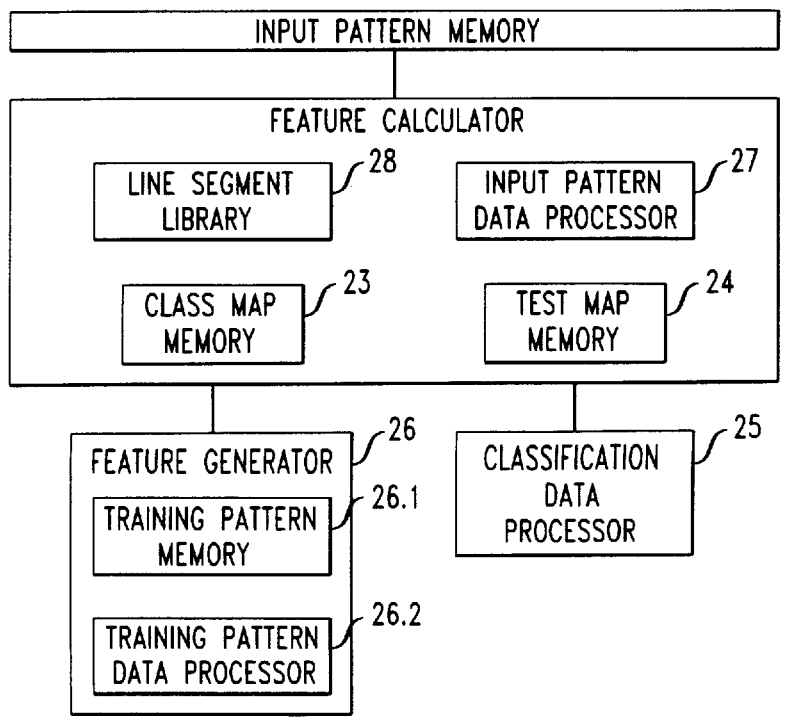
FIG. 2A

METHODS AND APPARATUS FOR CLASSIFICATION OF IMAGES USING DISTRIBUTION MAPS

This application is a continuation-in-part of application Ser. No. 08/335212, filed on Nov. 4, 1994 now abandoned.

FIELD OF THE INVENTION

The invention relates generally to the automatic interpretation of images and, more particularly, to the classification or recognition of images of machine-printed or hand-written symbols.

DESCRIPTION OF THE PRIOR ART

An important area of image interpretation is optical character recognition (OCR), in which images of symbols are automatically translated into binary codes representing the symbols. A major problem in optical character recognition is distinguishing similarly shaped symbols whose images are noisy; that is, images that suffer from degradation, distortion, or defects. These image defects may occur for many reasons, including variations of handwriting style, typeface, and size of text, as well as peculiarities of the spatial sampling rate, optical distortion, and other effects due to the physics of printing and imaging.

The complexity of these effects has, until recently, defied attempts to describe them quantitatively and exhaustively. Thus, the true class-conditional distributions of images cannot be predicted analytically in detail even given perfect knowledge of the ideal symbol shapes. In practice, these distributions have been accessible only empirically, in the form of finite data sets of images, gathered and labeled with ground truth at considerable expense. Such data sets, even when they number in the millions, are sparse compared to the variety of images that can occur in practice.

An automatically trainable method of the prior art will generally classify an unknown input image by comparing a set of features evaluated on the input image to a set or distribution of feature values associated with a given class. In this context, a feature is a function that returns a real number when it is applied to an image. The set or distribution of feature values associated with each of the image classes is constructed by applying the features to a training set; i.e., a set of images, each of which is labeled with its true class.

Features vary in complexity. For example, W. W. Bledsoe et al., "Pattern Recognition and Reading by Machine," 1959 *Proceedings of the Eastern Joint Computer Conference*, Academic Press (1959) 174–181, describes early work in which features were based on randomly chosen pairs of pixels. The possible numerical values of each pixel are the four binary values 00, 01, 10, 11, corresponding to the possible logical states of these pairs. This method was not accurate enough to use in a practical optical character reader.

Even very recent classification methods, using more complex features, often yield disappointingly low accuracy on isolated-character recognition problems. In such cases, it is seldom clear whether the inaccuracy is due to flaws in the classification methodology (e.g. poorly chosen features), or to poor quality of the training sets (e.g. too few samples), or to both. Given this uncertainty, and the expense of acquiring large and representative training sets, most OCR research in the last few decades has focused on heuristics for approximating the available sparse training sets, using a wide variety of methods for interpolation, smoothing, and analytic modeling of the feature distributions. In order to do this, many simplifying assumptions have necessarily been invoked concerning the forms of the distributions, e.g. that they are simply-connected, unimodal, convex, analytic, or parametric (e.g. multi-dimensional Gaussian).

However, many of the features that have proven effective have distributions that are quite complex, and only poorly modeled when these simplifying assumptions are made. As a result, these simplifying assumptions can introduce inaccuracies that reduce the dependability of image classifiers.

In an alternate strategy, sometimes referred to as the "nearest neighbor" strategy, only a few prototype images per class are stored, and a fixed global image metric $D(x,y) \geq 0$ (distance function between any two pair of images x and y) is used with the hope of generalizing from this sparse set to the true distribution. This approach is not entirely desirable, because there is no reason to believe that any single global distance function will correctly model the complexities of all class distributions.

Thus, practitioners in the field have hitherto failed to provide a practical image classification method that can combine strong features (i.e., features that, with high probability, will have substantially different values when evaluated on images selected from at least two different classes) with the accuracy that comes from realistic representation of the feature distributions.

SUMMARY OF THE INVENTION

We construct a family of class metrics $d_c(x) \geq 0$, one for each class c, each computing a distance from an unknown image x to the particular class c. Classification is performed according to minimum distance: the class c for which $d_c(x)$ is minimum is returned as the preferred class for x.

We construct, for each class, a detailed but space-efficient representation of the empirical class-conditional distribution of values of features, which we call a distribution map. In an illustrative distribution map, each value of each feature may be represented by a bit which is set to 1 if and only if that feature's value occurs in the training data for that class.

In use, an image classifier compares a test map, based on features evaluated on an input image, to plural class distribution maps based on a set of training images. The input image is assigned to the class of that class distribution map having the smallest distance to the test map. In one illustrative embodiment, the distribution map having the smallest distance to the test map is that distribution map that includes the greatest number of feature values in common with the test map.

Accordingly, the invention involves an image classifier for receiving an input image and assigning the input image to one of a plurality of image classes by comparing the input image to a training set of training images. The image classifier includes a plurality of class distribution maps. Each of these maps is based on a plurality of features evaluated on training images, and each map represents those feature values that occur at least once in the training set for training images belonging to the corresponding class.

The image classifier further includes means for constructing a test map by evaluating the plurality of features on the input image, and means for comparing the test map to the class distribution maps in order to identify which one of the class distribution maps has the least distance to the test map.

One advantageous method for evaluating features is carried out by storing the input pattern, in a digital memory, as a point in a representational space. A digital data-processing device (shown as element 27 of FIG. 22) retrieves one or more line segments from a library (shown as element 28 of FIG. 2A) of line segments constructed in the representational space, wherein each said line segment is subdivided into plural indexed sub-intervals and each line segment is associated with a respective feature. The digital data-processing device projects the input pattern onto each of the retrieved line segments. For each said line segment, the feature associated with that line segment is assigned a value equal to the index of the sub-interval onto which the input pattern is projected.

BRIEF DESCRIPTION OF THE DRAWINGS

FIG. 1 is an illustrative class distribution map.

FIG. 2 shows an illustrative computation of a distance from a test map the class distribution map of FIG. 1.

FIG. 2A is a block diagram of exemplary apparatus useful for the practice of the invention.

DETAILED DESCRIPTION OF A PREFERRED EMBODIMENT

Figure 3:
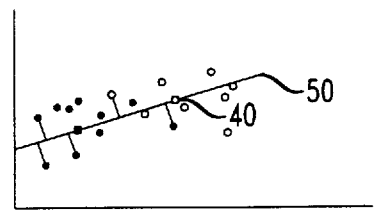
FIGS. 3 and 4 illustrate a possible procedure for constructing a new feature from, e.g., an input representation of a training image. For simplicity, the space represented by FIG. 3 has only two dimensions.

In general, there is a broad selection of metric features that are at least somewhat useful for pattern recognition. For example, many features that are well-known in the field of optical character recognition (OCR) will perform well, at least for discriminating limited classes of graphical symbols, in an approach such as ours, based on distribution maps. (Typical features are low-order polynomial functions of the image pixel values.)

However, there are situations in which such predetermined features are not adequate, or are inefficient. For example, certain features are useful because they respond to distinctions between characters in a particular writing system. Such features may be relatively ineffective, or very large training sets may be required, when they are applied to characters of other writing systems. For such situations, among others, it will be useful to employ an automatic method for constructing features that relate specifically to the set of training images (also referred to herein as training "samples") that are presented.

As discussed below, we have found a method for automatically constructing features that can be effective for finding small sets of features that will support highly accurate classifications.

Whether the features are specified manually at the outset, or constructed automatically during examination of the training set, or both in combination, some number M of features will ultimately be chosen. We require that the range of each feature consists of at most V distinct values.

We represent every image, whether in the training set or in the test set (to be classified), as a vector of the M feature values.

We construct a distribution map for each class. In preferred distribution maps, each of the V possible values that each feature may take is represented by a bit which is set to one if and only if that value occurs in the training data for that feature and that class. Each class distribution map contains M*V bits.

During recognition, an input image (i.e., a test sample) is illustratively classified as follows:
  a) compute the vector of feature values for the input image;
  b) compute a non-negative integer distance to each class, by adding 1 to the class-distance for each feature whose input value does not occur in the distribution map of that class;
  c) assign to the input image the class for which this distance is minimum;
  d) optionally reject, or mark 'ambiguous,' images for which there is a tie among one or more distances;
  e) optionally reject, or mark 'ambiguous,' images for which the gap between the minimum distance and the next smallest is less than a given threshold; and
  f) optionally reject images for which the minimum distance exceeds a given threshold.

The classification of a test sample is further explained with reference to FIGS. 1 and 2. The features extracted from the test sample have the values listed in row 10 of FIG. 2. A "0" is entered in row 20 of the same figure for each feature value that also occurs in the corresponding column of the class distribution map of FIG. 1. A "1" is entered for each feature value that does not occur in the corresponding column of the class distribution map. For the class represented by the map of FIG. 1, the corresponding element of the distance array is evaluated by summing the entries in row 20 of FIG. 2.

It is desirable to have training data of high quality; that is, data that are truly representative and of more than adequate size. For this reason, the smallest training set should contain at least k*V samples/class, where k is an integer greater than 1. Preferably, k is at least 10, because training sets substantially smaller than 10*V samples per class may fail to include feature values having significant rates of incidence.

If the training set has been selected randomly from a close approximation to the true defect distribution, then this minimum-size criterion helps assure that each feature value that can occur in the true distribution will, with high probability, also occur in the training set.

It should be noted that in the illustrative recognition process, each feature can contribute a 0 or 1 to the final "distance" computed by each class metric. That is, each feature contributes the same penalty for a failure to match, even though the range of some features (the number of distinct feature values) may be larger than others. (Other schemes for evaluating a total distance are also readily implemented. For example, the binary weighting scheme described here can be replaced by a multivalued or continuous weighting scheme.)

It should be noted in this regard that the number of features need not be fixed in advance. Instead, it can grow during training in response to the statistics of the training set.

We have described the functionalities of a machine for classifying images, such as the printed characters of an alphabet or other writing system. These functionalities are readily carried out by a programmed digital processor having adequate digital memory for storing the class distribution maps and such information as is required for defining the features. (In at least some cases, parameters that define the features may be stored as part of a computer program.)

Turning to FIG. 2A, such a classifying machine includes a digital data storage element 21 for receiving and storing the input images. These images are typically in the form of a vector of pixel values corresponding to a digitized pixel image. (These pixel values may be either gray-scale or binary values.)

The classifying machine optionally includes an image pre-processor for carrying out various transformations of the input images. These transformations may include encoding each input image in a form that is distinct from the pixel-value vector, but that preserves pertinent image information. These transformations may also include distortions according to a predetermined model of, for example, distortions induced by the printing process. These distortions are useful in the training phase (i.e., in the compilation of class distribution maps) for increasing the number and variety of training samples.

The classifying machine further includes a feature evaluator 22 that acts upon each training sample and upon each test sample to yield numerical feature values, a digital data storage element 23 for storing a library of class distribution maps that result from the operation of the feature evaluator on the training samples, and a digital data storage element 24 for storing the distribution maps of individual test samples.

The classifying machine further includes a processing element 25 for comparing the distribution map of each test sample to the class distribution maps, evaluating each respective class distance, and assigning the test sample to that class having the least class distance.

Advantageously, the classifying machine further includes a feature generator 26, including a memory 26.1 for storing a plurality of training patterns as points in a representational space, and a data processor 26.2. The feature generator is for constructing features that are specifically effective for the set of training samples that are presented. We now describe a procedure to be performed by such a feature generator.

One current implementation of the inventive method is carried out by an SGI Challenge XL computer. However, a significant advantage of our invention is that because it provides a compact representation of class-conditional distributions within the sample space, it will be usefully implemented on smaller machines such as personal computers and, in some cases, even on hand-held computing devices.

Constructing Features for Perfect Metrics

As noted, the input images are typically in the form of vectors of pixel values. These vectors typically occupy a vector space of high dimensionality. For example, for a 16×16 pixel array, this dimensionality is $16^2=256$. We have observed that when there is high-dimensional input, different classes rarely spread over nested regions of the vector space. We have further observed that in such situations, each input image can often be isolated from images of different classes by one or more parallel hyperplanes (of dimensionality that is one less than the dimensionality of the vector space); i.e., the classes are partially linearly separable.

Our procedure searches for features that fully discriminate between partially linearly separable classes. These features are mathematical abstractions based on the distribution of input images in a vector space such as the pixel space described above. These features do not rely in any direct way upon recognizable elements of shape, such as curvature or stroke orientation.

Our procedure progressively eliminates ambiguities in the training set by adding, in a sequence of iterations, new features that are designed to separate the currently ambiguous samples. The procedure is guaranteed to terminate when all classes (except for those that are inherently ambiguous) have been discriminated.

The procedure is applied to each class C in turn. (An example of a class is the set of all input images that are to be identified with a given alphanumeric character, such as the alphabetical letter a.) Initially, each of the training samples is assigned to one of two sets, here denoted $S_1$ and $S_2$. $S_1$ consists of all training samples that belong to the class C, and $S_2$ consists of all other training samples.

Thus for example, the training samples belonging to $S_1$ are represented in FIG. 3 by black dots, and those belonging to $S_2$ are represented by white dots. It should be noted that for pedagogical purposes, FIG. 3 depicts a two-dimensional vector space. As noted above, the dimensionality of this space will generally be much greater.

The respective mean value 30, 40 taken over each of the sets $S_1$ and $S_2$ is calculated, and a line 50 is drawn passing through these respective mean values. All of the training samples are then projected onto this line. (Several exemplary projections are shown as broken lines in FIG. 3.)

The images of the training samples under this projection will occupy a portion of line 50 referred to as the range of the projection. This range is terminated at each end by a respective outermost image.

Figure 4:
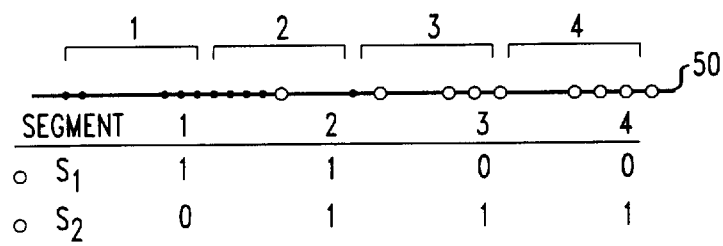

The range of the projection is divided evenly into a fixed number $\Sigma$ of segments, as shown in FIG. 4. A segment is said to be marked for class C if the projection of any sample belonging to class C lies on that segment.

The above-described steps lead directly to the first feature definition. Let the respective segments be labeled, in sequence, by the integer indices $1, 2, \ldots, \Sigma$. Then for a given sample, the feature value is equal to the index of the segment onto which that sample has been projected. For a given class, the distribution map consists of the indices of all segments marked for that class.

If there are no segments marked for both $S_1$ and $S_2$, then this feature has successfully discriminated all the images in $S_1$. In that case, the procedure terminates for class C, and the procedure is repeated, from the beginning, for a new class.

If there are one or more segments marked for both $S_1$ and $S_2$, $S_1$ is pruned. That is, if a sample in $S_1$ is projected onto a segment that contains no images from $S_2$, that sample is removed from $S_1$. Only those samples that overlap with $S_2$ are retained.

For example, Segment 2 of FIG. 4 is marked for both $S_1$ and $S_2$, and therefore the $S_1$ samples mapped to that segment are considered to overlap with $S_2$.

The mean value of the pruned $S_1$ is calculated, and the above-described procedure is iterated using the pruned $S_1$ and all the images in $S_2$. In the case that all samples in $S_1$ overlap with those from $S_2$, then $S_1$ is split into two halves and the procedure is applied to each half.

These iterations continue until either $S_1$ has been exhausted, or it is impossible to separate $S_1$ from $S_2$ by any projection (e.g. when all the images in both $S_1$ and $S_2$ are identical, for practical purposes). Each iteration gives rise to an additional feature.

After the termination of the last iteration for a given class, the entire procedure is repeated for a new class until all of the classes have been exhausted. When the procedure is initiated for a new class C', all of the class-C samples are returned to set $S_2$, and the class-C' samples are placed in set $S_1$.

Figure 5:
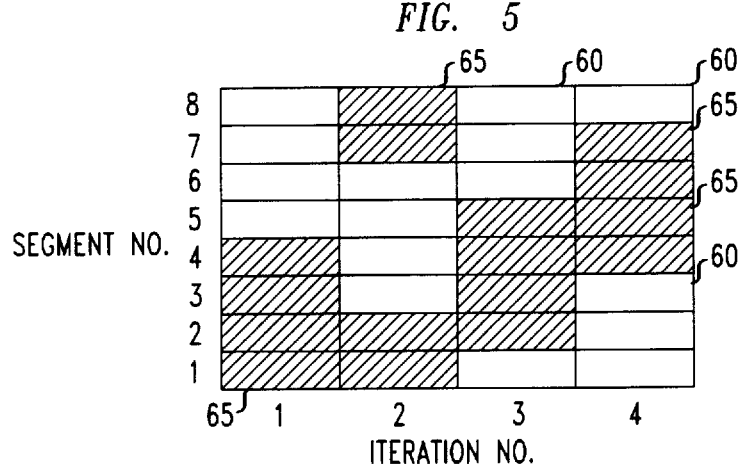
FIG. 5 is a hypothetical class distribution map presented here for pedagogical purposes only and not meant as a realistic portrayal.

FIG. 5 is a hypothetical class distribution map resulting from four iterations, each involving a projection onto a line divided into eight segments. White regions 60 represent non-occurring feature values (a logical "0" for the corresponding bit) and black regions 65 represent feature values that occur at least once in the training set (logical "1"). Each feature in this map corresponds to one of the iterations of the above-described procedure.

Figure 6:
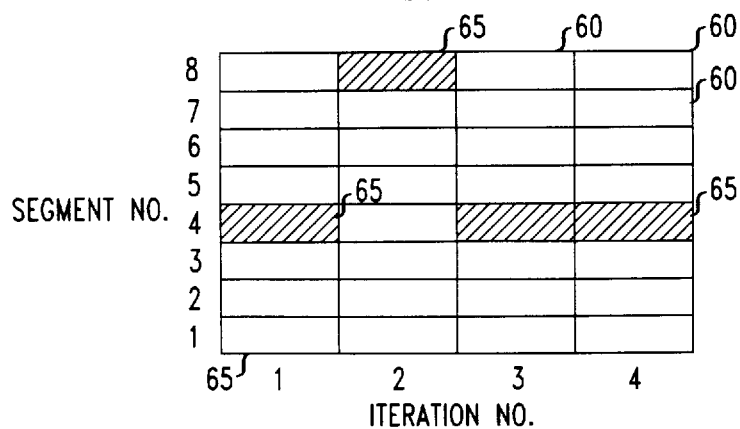
FIG. 6 is a hypothetical test map presented here for pedagogical purposes only.

FIG. 6 is a hypothetical test map that has zero class distance to the class C represented by FIG. 5. Except for those samples whose conformation is inherently ambiguous, every training sample that does not belong to class C will have a class distance of at least 1, because there is at least one feature effective for distinguishing it. Every training sample that does belong to class C will have a class distance of 0.

It should be noted that with each new iteration, some samples previously pruned from $S_1$ may overlap with $S_2$ when they are projected onto the new version of line 50. However, there is no need to backtrack to those samples, because one projection capable of discriminating them has already been provided. (Consequently, the class distance between such a sample and the correct class is guaranteed to be smaller, by at least one, then the distance to any incorrect class.)

As described above, the directions of the linear projections are determined by the spread of the respective classes in the vector space. This method can be improved by an optimization procedure for choosing those projections that lead to as few ambiguities as possible. For example, the fixed-increment perceptron-training algorithm can be used to find a hyperplane between $S_1$ and $S_2$ that minimizes the number of $S_1$ samples falling on the $S_2$ side, and vice versa. This algorithm is described, e.g., in R. O. Duda and P. E. Hart, *Pattern Classification and Scene Analysis*, John Wiley and Sons, New York (1973), pp. 142–145, hereby incorporated by reference.

Such an optimization procedure is readily applied here by replacing line 50 with the line perpendicular to the pertinent hyperplane.

EXPERIMENTAL RESULTS

We tested the procedure in an experiment on a constrained problem in optical character recognition. We chose the problem of distinguishing between images of the symbols "c" and "e" in the Adobe Times Roman typeface, with noise introduced by a parameterized model of document image defects.

Using the defect model and the ideal shape prototypes, we generated 500,000 training samples that are divided into 59 sets. There are 1,000 (500 "c"s and 500 "e"s) samples in each of the first ten training sets, and 10,000 (5,000 "c"s and 5,000 "e"s) in the subsequent ones. The test set consists of 50,000 "c"s and 50,000 "e"s (100,000 samples in total). The same test set is used to measure the error rate throughout the experiment, regardless of changes in the training set and the features. Each sample image is binarized and size-normalized to 48×48 pixels. The binary values of the pixels are used as input.

At each iteration, linear projections were found using the fixed-increment perceptron-training algorithm. For each projection, the range of values was divided into 25 segments. Once sufficient features were found to fully discriminate a given training set, the next training set was added and the algorithm searched for new features to resolve new ambiguities. We considered ambiguities in the new training set only and did not backtrack to re-examine previous training samples.

When the algorithm finished with a training set, we tested the accuracy of the classifier with the fixed test set. We terminated the experiment after 500,000 training samples were used, because the outcome of the experiment had clearly stabilized by this point.

Figure 7:
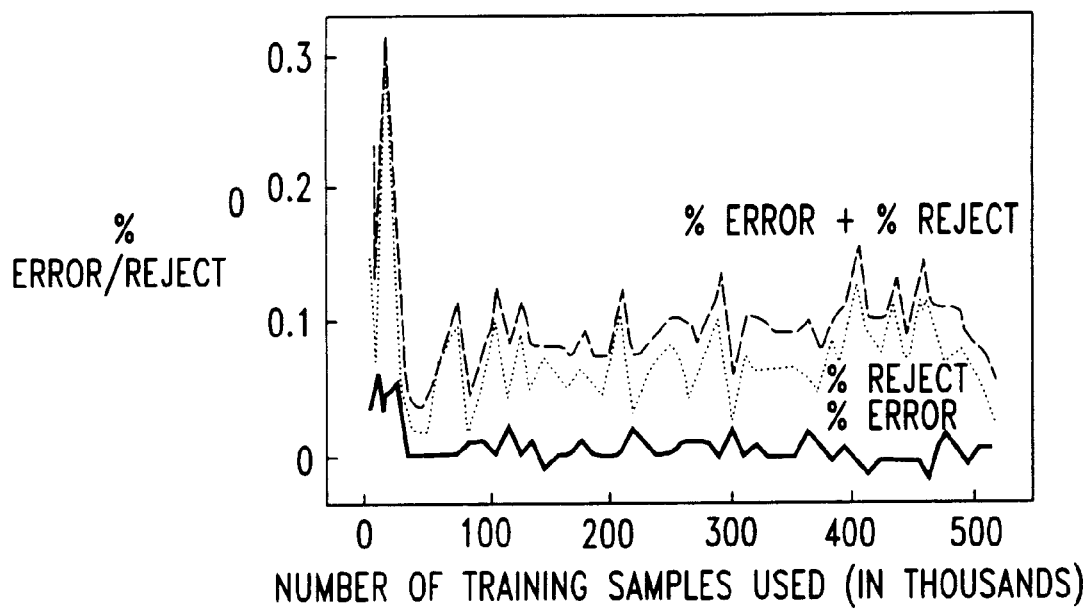
FIG. 7 is a graph showing how the error rate and the rate of rejection of test samples (as ambiguous) depended on the size of the training set, when classification was based upon features generated according to one embodiment of the invention.

From FIG. 7 it is evident that the accuracy of the classifier became stable from early on (when 100,000 training samples were used).

Figure 8:
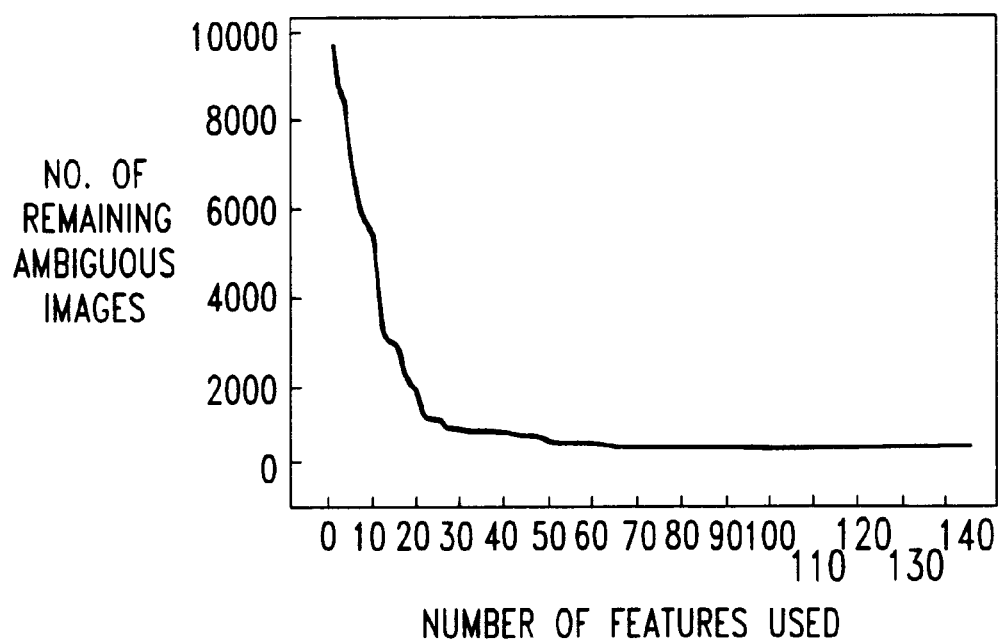
FIG. 8 is a graph illustrating the efficiency of individual features in distinguishing ambiguous test samples, in the classification procedure of FIG. 7.

The results suggest that the initially derived features contribute most to classification accuracy. We can measure the efficiency of each feature by the number (or percent) of samples separated from other classes by using that feature. As an example, we examined the 139 features obtained before training set 59 was added. FIG. 8 shows the numbers of samples distinguished by each of those 139 features, starting from the features derived using training set 1. This graph illustrates the ability of the method in selecting the most useful features first. Since the features are ordered by their efficiency, the sequence can be pruned according to requirements on accuracy and availability of resources.

The invention claimed is:

1. A machine for automatically classifying graphical input patterns, comprising:
   a) a memory for storing digital representations of the input patterns;
   b) a feature calculator for calculating one or more single-valued functions of a current input pattern and storing the result of said calculation as an array to be referred to as a test map; and
   c) a data processor for (i) comparing at least a portion of the test map to each of a plurality of data arrays, each array of said plurality representing a particular one of plural classes to which a given input pattern may be assigned, and responsive to said comparison, (ii) assigning the current input pattern to one of said classes;

wherein the feature calculator comprises:
   d) a library of line segments constructed in a representational space for input patterns, each said line segment subdivided into plural indexed sub-intervals; and
   e) a data processor for (i) projecting the current input pattern onto each line segment in said library, and (ii) storing in the test map of said pattern the index of each sub-interval onto which said pattern is projected.

2. The machine of claim 1, further comprising a feature generator for creating said library of line segments, said feature generator comprising:
   a) a memory for storing a plurality of training patterns as points in the representational space; and
   b) a data processor for constructing line segments in said space, each said line segment directed such that training patterns of a given class are at least partially separable by projection onto particular sub-intervals thereof.

3. A method for automatically classifying a graphical input pattern, comprising:
   a) in a digital memory, storing the input pattern as a point in a representational space;
   b) in a digital data-processing device, calculating one or more single-valued functions of the input pattern, said functions to be referred to as features;
   c) in a digital memory, storing the result of said calculation as an array to be referred to as a test map; and
   d) in a digital data-processing device, comparing at least a portion of the test map to each of a plurality of data arrays, wherein each array of said plurality represents one of a plurality of classes; and e) responsive to said comparison, assigning the input pattern to one of said classes;

wherein the calculating step comprises:

f) retrieving one or more line segments from a library of line segments constructed in the representational space, wherein each said line segment is subdivided into plural indexed sub-intervals and each line segment is associated with a respective feature;

g) projecting the input pattern onto each of the retrieved line segments; and h) for each said line segment, assigning a value to the feature associated with that line segment, said value equal to the index of the sub-interval onto which the input pattern is projected.

4. In a machine for automatically classifying graphical input patterns by comparing features of said patterns to class-conditional distributions of said features over a training set of training patterns, a method for generating features, comprising:

a) in a digital memory, storing each training pattern of the training set as a point in a representational space;

b) constructing line segments in said space, each said line segment subdivided into plural indexed sub-intervals, each said line segment directed such that training patterns of a given class are at least partially separable by projection onto particular sub-intervals thereof; and c) storing said line segments in a digital memory as a library of line segments, each said line segment to be taken as a feature, each feature to be assigned a value equal to the index of the sub-interval onto which a given input image is projected.

5. The method of claim 4, wherein the training set comprises training patterns of plural classes, and the constructing step comprises:

constructing sufficiently many line segments that for every training pattern of any given class that is not inherently ambiguous, there is at least one line segment directed such that the projection of said training pattern onto said line segment occupies a sub-interval free of projections of patterns of any other classes.

* * * * *